(No Model.)
M. R. HUBBELL.
WEIGHING AND COMPUTING SCALE.
No. 586,553. Patented July 20, 1897.
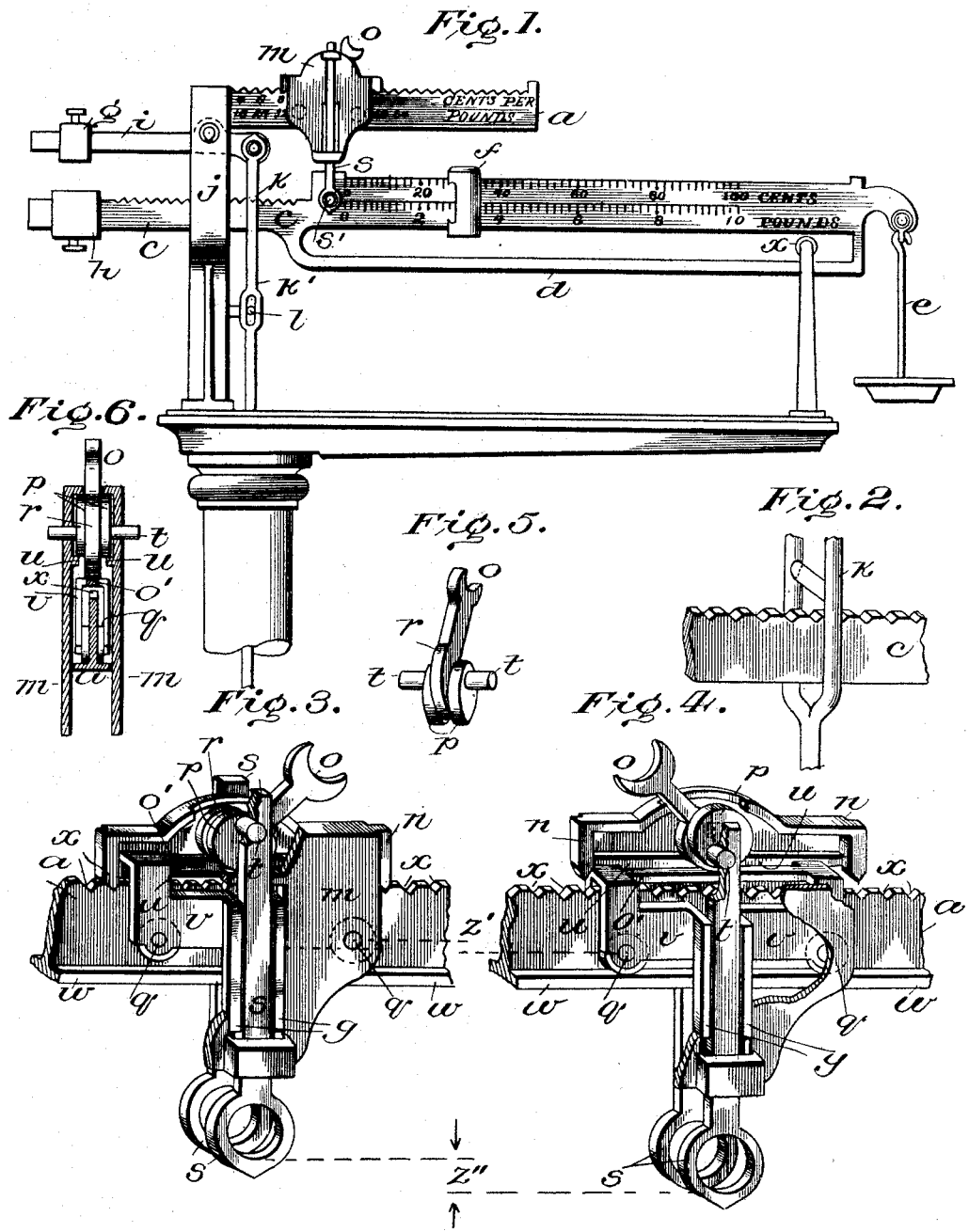
Witnesses
Inventor
Myron R. Hubbell
by J. Fred Reily
his Attorney

United States Patent Office.

MYRON RODNEY HUBBELL, OF WOLCOTT, VERMONT.

WEIGHING AND COMPUTING SCALE.

SPECIFICATION forming part of Letters Patent No. 586,553, dated July 20, 1897.

Application filed April 18, 1896. Serial No. 588,141. (No model.)

*To all whom it may concern:*

Be it known that I, MYRON RODNEY HUBBELL, of Wolcott, in the county of Lamoille and State of Vermont, have invented certain new and useful Improvements in Weighing and Computing Scales, of which the following, taken in connection with the accompanying drawings, is a specification.

My invention pertains to the class of scales in which provision is made, by varying the fulcrum distance of the knife-edge pivots or bearings of the scale-beam, to alter the distance which the sliding poise on the scale-beam must move to balance a given load, and so to adapt the same scale to different standards of weight or to indicate correctly bushels of different kinds of grain or values of articles weighed when the price per pound is given.

The following description relates to the invention as adapted to this latter use; but its adaptation to other uses will be readily understood from this.

The device herein described is so simple and so easily used that it would be difficult either accidentally to set it wrong or to read the record incorrectly, and there is hardly any liability of mistakes. The scale-beam hangs by its main pivot in a clevis or loop suspended from a beam-carrier which rolls along or is clamped upon an arm projecting from the standard-pillar of the scale, the clamping arrangement fixing it accurately at any desired point, as indicated by the price graduation of this projecting arm. The position of this beam-carrier determines with the same exactness the position of the scale-beam, which hangs from it, so that when this is raised vertically up by the movement of the cam in the beam-carrier the back end of the beam engages a knife-edge carried by the steelyard-rod, connecting with the levers of the scale below at a point on the beam which, measured from the knife-edge pivot supporting the beam, is exactly the right distance to correspond to the price indicated on the fixed arm at the point where the beam-carrier is clamped. A small supplementary beam with an adjustable balance-weight balances the unloaded platform and lower levers of the scale, so that the only force acting upon the scale-beam which is to indicate values is the weight of the article to be weighed, and this beam is exactly balanced when there is nothing upon the platform.

In the accompanying drawings similar parts are indicated by similar letters of reference.

Figure 1 is a side view of the scale-beam as mounted and of the connected parts. Fig. 2 shows in perspective and enlarged the way in which the back end of the scale-beam engages the knife-edge carried by the steelyard-rod. Figs. 3 and 4 show in perspective the beam-carrier, with parts broken away to exhibit its interior construction. Fig. 5 shows more clearly the double cam therein, and Fig. 6 gives a section through the beam-carrier to show the surfaces upon which the cam acts as it turns.

$b$ is the scale-beam, hanging by its main knife-edge pivot $s'$ from the sliding loop $s$ and having its parallel branch $d$ below the roller $x$, which roller limits its vibratory motion. The back end $c$ of this beam is notched on its upper edge, the bottom of the notches being level with the edge of the supporting-pivot and carefully spaced, so that when they engage the knife-edge carried by the steelyard-rod $k'$ the leverage shall be precisely what is required for the uses of the scale. It is understood that the knife-edge $k$ is somewhat sharper than the angle of the bottom of the notch which it enters, so that while its position is accurately determined it can rock in the notch without binding or producing any friction.

The scale-beam carries a counterpoise $e$ in the usual position at its end for the usual use and at the other or back end a balance-weight $h$, which must be heavy enough to balance it when entirely disengaged from the steelyard-rod and load.

A supplementary beam $i$, connecting by pivot and loop with the same steelyard-rod, is arranged with its balance-weight $g$ to carry the weight of the main levers and the platform resting upon them, as does the upper beam of the series patented by T. Fairbanks May 10, 1870, No. 102,791, and as is common in furnace-charging scales. This beam may be graduated to weigh loads when the other is quite disconnected, or the weight in pounds and ounces may be read on the lower line of the beam first described when the beam-carrier is set at "10," and the scale weighs like a common scale. Whether graduated for use in weighing or not the supplementary beam must balance the weight of the moving parts of the scale, so that this weight shall exert no force upon the price-beam, but shall leave that entirely free to respond only to the weight of the article placed upon the platform of which the value at a certain price is to be indicated. This supplementary beam $i$ keeps the steelyard-rod $k'$ in place for the proper notch of the beam $c$ to engage it, and this position is further controlled by the pin $l$ through a long oval opening in the steelyard-rod, upon which pin the weight rests when the said rod is dropped to its lowest position.

$a$ is a fixed level arm extending from the top of the standard-pillar of the scale, having flanges on each side projecting slightly, so that the section of the arm and flanges is that of an inverted T. The upper edge of the arm is notched, and on the side the price per pound is indicated by a graduation by which the beam-carrier may be set. This beam-carrier $m\ o$ of Fig. 1 consists of three parts arranged to move vertically on each other and having their relative position controlled by a double cam moved by the handle $o$. When this handle is moved to the left, as shown in Fig. 4, the four rollers $q\ q$ of the carriage $v\ v$ rest upon the flange $w\ w$ of the level arm $a$. The other parts all are supported by this carriage, and the beam-carrier, with the beam hanging from it, moves easily to any point upon the arm, bringing the indicator at the left edge to the notch corresponding to the price desired. Then moving the handle of the cam to the right to the position shown in Fig. 3 the outside frame $m$ is carried down, so that the points $n\ n$ rest in the notches selected of the series $x\ x$, and the beam-carrier is held firmly in place, and at the same time the two parts of the loop $s\ s$, in which rests the main bearing-pivot of the beam, are carried upward, so that this beam is lifted into engagement with the knife-edge $k$ of the steelyard-rod $k'$ and the conditions of correct weighing are established.

Some of the advantages of my device may be secured if all these details of construction are not carried out. The beam-carrier may simply slide upon the level arm with no carriage or locking device, the price-graduation being upon the end $c$ of the beam. This end $c$ may be disengaged from the knife-edge $k$, without lowering the main pivot, by raising the end $b$; but I consider the arrangement shown the most convenient and best.

I make the curvature of the loop $s$, in which the main pivot $s'$ rests, and the curvature of the loop and bearing receiving the two pivots of the auxiliary beam $i$ sharp, or small in comparison with the pivots carried, so that these pivots are held from moving to the right or left, and the main beam and steelyard-rod cannot be displaced with reference to each other, the pin $l$ in the opening of the steelyard-rod aiding in holding the said rod in position.

I do not claim the use of the supplementary beam as such, since two or more beams have often been connected with the same steelyard-rod; but the use of this small beam at the end of the said rod, its pivots being held in place by the sharp curvature or nearly V shape of their bearings, is new, as is also the use of the pin $l$ in the opening of the rod for the purpose of insuring that the knife-edge $k$ shall engage the selected notch of the beam.

Having described what I consider the best form of carrying out my invention, I claim—

1. The herein-described improvement in scales, comprising a scale-beam provided with a rearward extension, a carrier for said scale-beam provided with means for raising and lowering the latter, a support for said carrier, a steelyard-rod normally in engagement with said extension, and means for limiting the movement of said steelyard-rod, substantially as set forth.

2. The herein-described improvement in scales, comprising a scale-beam provided with a rearward extension, a longitudinally-movable carrier adapted to support said scale-beam and provided with means for raising and lowering the latter, a support for said carrier, a steelyard-rod normally in engagement with said extension, and means for limiting the movement of said steelyard-rod, substantially as set forth.

3. The herein-described improvement in scales, comprising a frame or support, an arm extending therefrom, a longitudinally-movable carrier mounted on said arm, a scale-beam pivotally supported by said carrier and having a rearward extension, means connected with said carrier adapted to effect the raising and lowering of said scale-beam and hold said carrier stationary, a steelyard-rod normally in engagement with the extension of said scale-beam, and means for limiting the movement of said steelyard-rod, substantially as set forth.

4. The herein-described improvement in scales, comprising a frame or support, an arm extending therefrom having lateral flanges, a longitudinally-movable carriage having wheels resting on said flanges, a scale-beam pivotally supported by said carriage and having a rearward extension, means carried by said carriage adapted to effect the raising and lowering of said scale-beam and hold said carrier stationary, a steelyard-rod normally in engagement with the extension of said scale-beam, and means for limiting the movement of said steelyard-rod, substantially as set forth.

5. The herein-described improvement in scales, comprising a frame or support, an arm extending therefrom, a longitudinally-movable carrier mounted on said arm and having a movable member normally in engagement with the latter, a scale-beam pivotally supported by said carrier and provided with a rearward extension, means for holding the movable member of said carrier normally in engagement with said arm and adapted to effect the raising and lowering of said scale-beam, a steelyard-rod normally in engagement with the extension of said scale-beam, and means for limiting the movement of said steelyard-rod, substantially as set forth.

6. The herein-described improvement in scales, comprising a scale-beam provided with a rearward extension, a longitudinally-movable carrier for said scale-beam, a support for said carrier, a cam-lever adapted to hold said carrier stationary and effect the raising and lowering of said scale-beam, a steelyard-rod normally in engagement with the extension of said scale-beam, and means for limiting the movement of said steelyard-rod, substantially as set forth.

7. The herein-described improvement in scales, comprising a scale-beam, provided with a rearward extension, a longitudinally-movable carrier for said scale-beam, a support for said carrier, a cam-lever adapted to hold said carrier stationary and effect the raising and lowering of said scale-beam, a steelyard-rod normally in engagement with the extension of said scale-beam, means for limiting the movement of said steelyard-rod, and a counterbalanced lever pivotally connected to the upper end of said steelyard-rod, substantially as set forth.

8. The herein-described improvement in scales, comprising a frame or support, an arm extending therefrom having notches therein, a longitudinally-movable carrier mounted on said arm and having a movable member normally in engagement with said notches, arms depending from said carrier, a scale-beam pivotally supported by said arms and having a rearward extension, a cam-lever supported by said carrier and in engagement with the movable member and depending arms of the latter, a steelyard-rod normally in engagement with the extension of said scale-beam, and means for limiting the movement of said steelyard-rod, substantially as set forth.

In testimony whereof I have signed my name to this specification, in the presence of two subscribing witnesses, on this 4th day of April, A. D. 1896.

MYRON RODNEY HUBBELL.

Witnesses:
MOSES J. LEACH,
A. G. STEVENS.